United States Patent
Russell et al.

(10) Patent No.: US 6,490,929 B1
(45) Date of Patent: Dec. 10, 2002

(54) VIBRATION DOSIMETER WORN BY AN OPERATOR

(75) Inventors: Andrew Charles Russell, Newcastle upon Tyne (GB); Simon Clive Hobson, North Shields (GB)

(73) Assignee: BG Transco PLC, London (GB)

( * ) Notice: Subject to any disclaimer, the term of this patent is extended or adjusted under 35 U.S.C. 154(b) by 0 days.

(21) Appl. No.: 08/913,715

(22) PCT Filed: Mar. 21, 1996

(86) PCT No.: PCT/GB96/00696

§ 371 (c)(1),
(2), (4) Date: Jul. 7, 1999

(87) PCT Pub. No.: WO96/29581

PCT Pub. Date: Sep. 26, 1996

(30) Foreign Application Priority Data

Mar. 22, 1995 (GB) .............................................. 9505853

(51) Int. Cl.⁷ ...................... G01M 13/00; G08C 19/00; G08C 17/00; G08B 21/00

(52) U.S. Cl. ...................... 73/660; 340/683; 340/870.3; 340/870.28

(58) Field of Search .............................. 73/570, DIG. 1, 73/658, 649, 579, 1.82, 1.85, 646, 647, 648, 593, 583, 660; 340/870.01, 870.3, 669, 679, 680, 683, 870.28

(56) References Cited

U.S. PATENT DOCUMENTS

| | | | | | |
|---|---|---|---|---|---|
| 4,073,194 A | * | 2/1978 | Wilson et al. | ................ | 73/646 |
| 4,475,401 A | | 10/1984 | Punia | | |
| 4,559,828 A | * | 12/1985 | Liszka | ........................ | 73/658 |
| 5,602,757 A | * | 2/1997 | Haseley et al. | ........ | 364/551.01 |
| 5,808,903 A | * | 9/1998 | Schiltz et al. | ............... | 364/566 |
| 6,006,164 A | * | 12/1999 | McCarty et al. | .............. | 702/56 |
| 6,014,896 A | * | 1/2000 | Schoess | ....................... | 73/583 |
| 6,035,719 A | * | 3/2000 | Toyota | ........................ | 73/649 |

FOREIGN PATENT DOCUMENTS

| | | |
|---|---|---|
| SU | 1254312 | 8/1986 |
| SU | 1821650 | 6/1993 |

* cited by examiner

Primary Examiner—Richard A. Moller
(74) Attorney, Agent, or Firm—Larson & Taylor, PLC

(57) ABSTRACT

A vibration monitor is provided which is worn on the wrist of an operative for an operating plant or apparatus. The monitor includes a piezoelectric transducer and associated circuitry which generates electronic digital signals during the periods when vibrations are experienced by the operative. Preferably, the plant or apparatus has a transmitter which transmits a code identifying the plant which is received by the monitor. Alternatively, the code may be entered manually. The monitor preferably includes a logger which can be connected to a host computer which data can be transferred over an external communications link. The logger includes a storage device for storing how long the operative is subjected to vibrations.

18 Claims, 6 Drawing Sheets

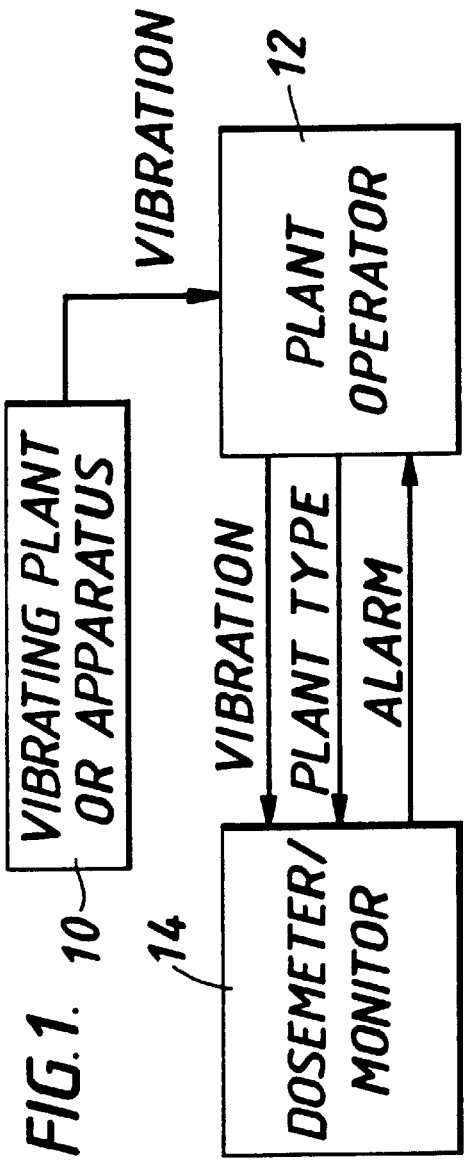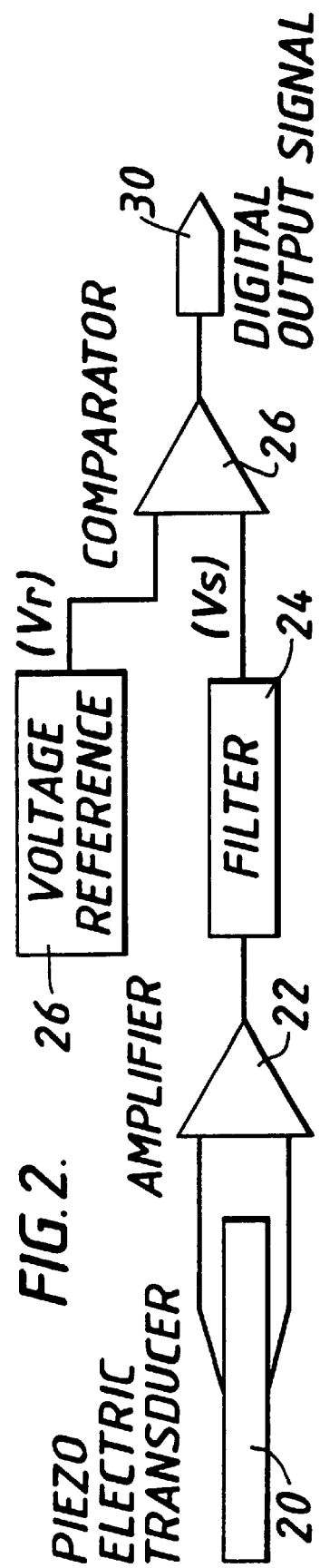

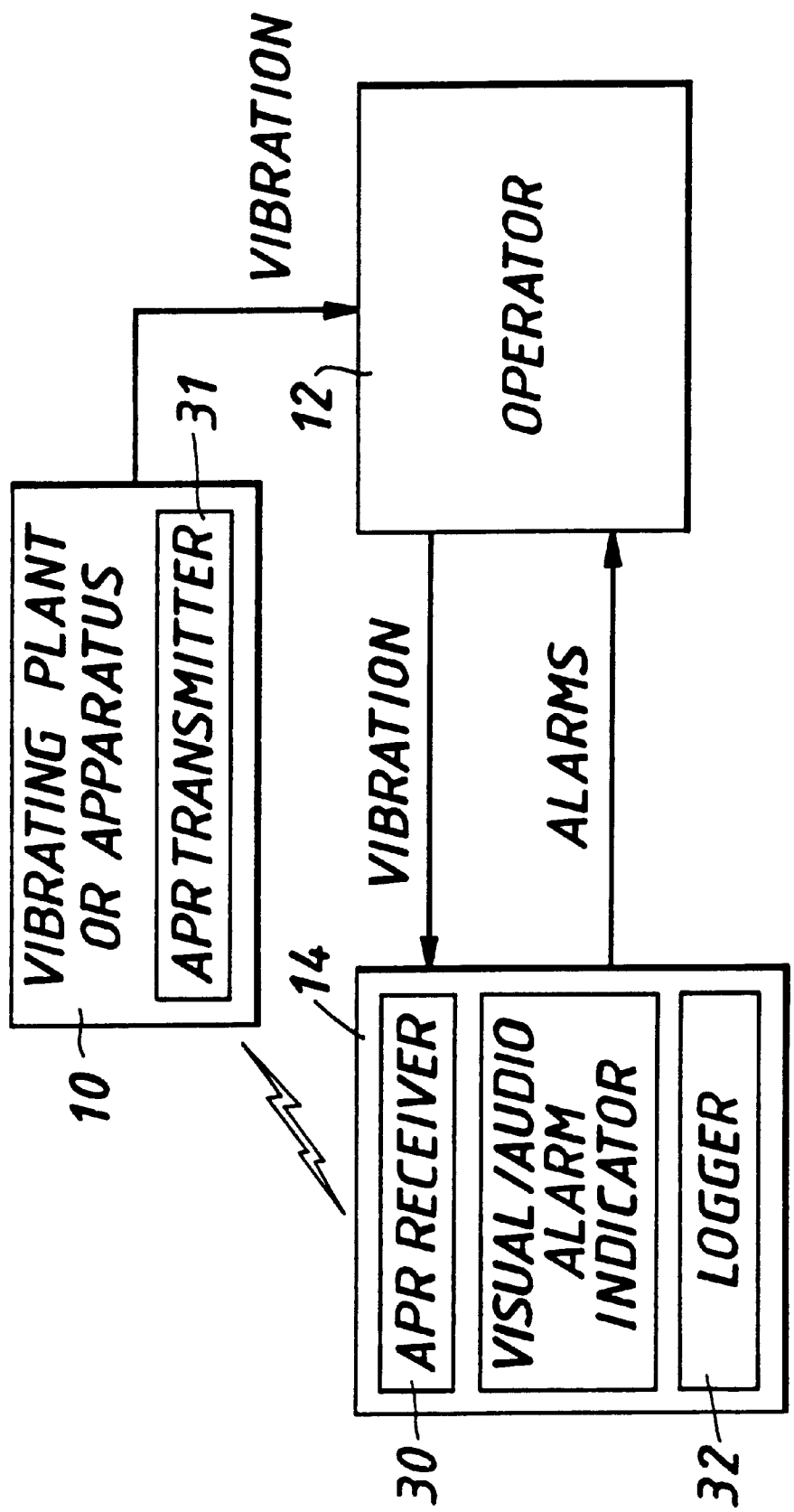

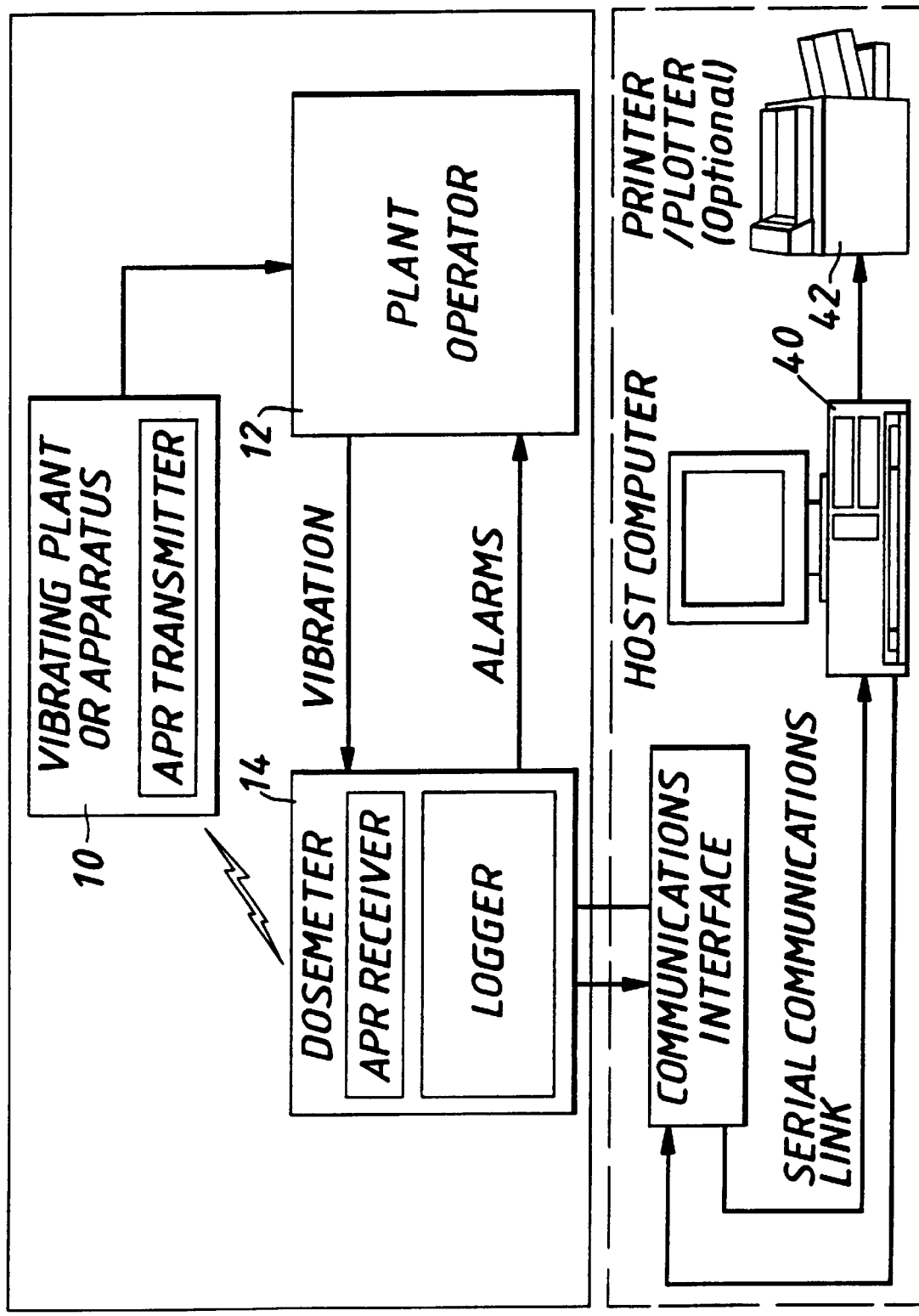

VIBRATION DOSIMETER WORN BY AN OPERATOR

BACKGROUND OF THE INVENTION

1. Field of the Invention

The invention relates to vibration monitors.

2. Related Art

Personnel are required to operate in the field of gas operations apparatus such as road breakers, vibro tampers, rock drills, pole tampers and hand drills for example all of which impose vibrations on the hands of the operator. In other fields, operatives are required to use similar or other vibratory apparatus which impose vibrations on the hands or on other parts of the body or on the body as a whole. These vibrations can cause disease.

SUMMARY OF THE INVENTION

The invention is concerned with providing a low cost vibration monitor useful in monitoring the vibrations experienced by an operative.

According to the invention there is provided a vibration monitor to be worn by an operative comprising:

means for identifying plant or equipment in use by the operative to allow a predetermined vibration level value associated with that plant or equipment to be available to the monitor;

sensor means for detecting that vibration is occurring; and
means for determining the elapsed time during which the vibrations are detected.

A code identifying the apparatus responsible for imposing the vibrations can, in one form of monitor, be manually entered into the monitor; alternatively the code can be transmitted by a transmitter attached to the plant and received by the monitor.

Alternatively, the actual value of the previously-measured vibration magnitude of the apparatus responsible for imposing the vibrations is transmitted by a transmitter attached to the plant and is received by the vibration monitor as the expected vibration level.

Preferably, the data logger has an external communication facility which allows communication with a visual display, printer, computer, or other data processing device.

Further according to the invention there is provided a method of monitoring vibration imposed by apparatus on an operative and comprising:

idenitifying plant or equipment in use by the operative to allow predetermined vibration level value associated with that plant or equipment to be available to the monitor;

sensing whenever vibrations are occurring and determining the elapsed time during which the vibrations are detected.

The data captured may be processed to give an accumulated measure of the vibration dose experienced by the operative.

Still further according to the invention there is provided a plant identity mechanism for use with a vibration monitor including means for producing an output indicative of the plant or equipment being utilised to allow vibration levels to be determined.

BRIEF DESCRIPTION OF THE DRAWINGS

Several embodiments of vibration monitor and associated equipment will now be described by way of example with reference to the accompanying drawings in which:

FIG. 1 is a block diagram of a basic vibration monitor;

FIG. 2 is a block diagram showing the principal components of vibration monitor;

FIG. 3 is a block diagram showing a personal vibration monitor;

FIG. 7 is a block diagram of a vibration monitor showing a host computer to which it is connected.

Figure 4:
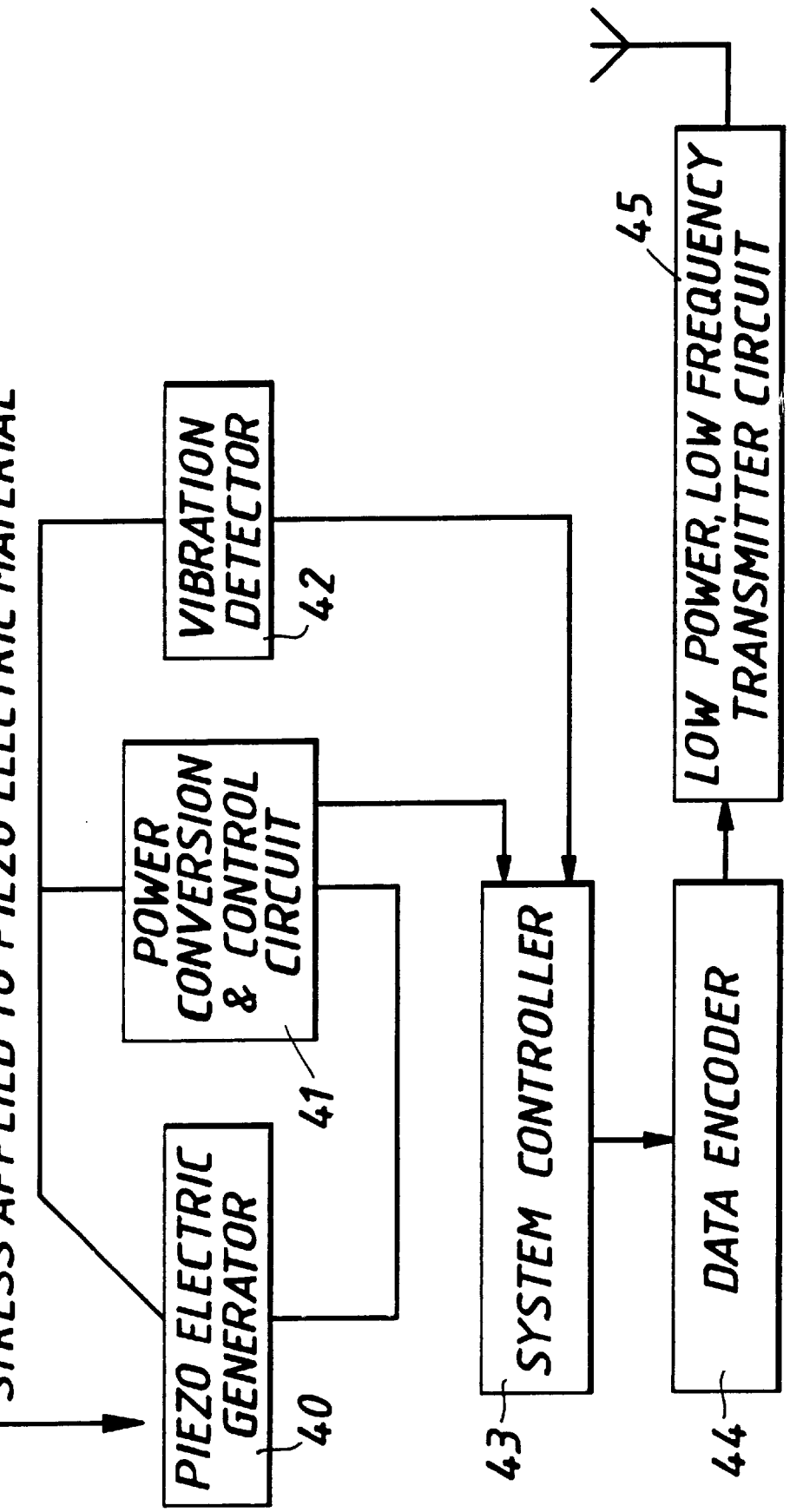
FIG. 4 is a block diagram of an automatic plant recognition transmitter using a piezo electric kinetic power source.

The arrangement of FIG. 1 shows an implementation of a basic vibration monitor.

Vibrating plant or apparatus is shown at 10 imposing vibrations on a user or operative (shown schematically as block 12). The operative wears the vibration monitor 14, preferably on his wrist though other locations are possible.

The vibration monitor 14 could emit an alarm when the accumulated vibration dose exceeds a predetermined threshold, although it can alternatively simply record the time period over which the vibrations are detected.

In order to reduce the cost of the device, the monitor is designed simply to determine that vibrations are occurring and not to measure the actual level of the vibrations. The expected level of vibrations is known for any given apparatus to be used by an operative, because these will have been premeasured when designing the system and values prestored within the monitor. This information can then be identified for any given apparatus or plant which is to be used.

A code identifying the type of apparatus 10 is manually entered into the vibration monitor 14. For example, a set of keys (not shown) fitted to the monitor 14 may be operated by the operative 12 which result in the insertion of the code. The code identifies the type of apparatus and hence the level of vibration expected when it is used.

DESCRIPTION OF THE PREFERRED EMBODIMENTS

As the vibration monitor requires a low cost vibration measurement transducer and the most commonly used and economical transducer for vibration is the accelerometer (typical cost £50) this is too expensive when compared to the target cost of the monitor. It became clear that an alternative to commercially available vibration transducers was required. Following experimentation, it was discovered that a piezo electric sounder disc could be used in conjunction with suitable signal processing electronics to fulfil the need.

Piezo electric sounder discs are generally thin circular discs, with two electrodes, and are available in diameters suitable for incorporation in the monitor described so far. These discs are commonly used as audio sounders in, for example, digital wrist watches which cost only a few pence.

FIG. 2 shows a schematic diagram of the piezo-electric transducer and the associated electronic circuitry used in the vibration monitor which is used merely to determine that vibrations are occurring rather than measuring the specific value or level of vibration.

The monitor would typically be of the approximate size and shape of a wrist watch, and would be worn as such.

The piezo-electric transducer 20 is subjected to an acceleration, e.g. as produced by vibrations from the vibrating apparatus 10 and a very small voltage is generated. This voltage is amplified in amplifier 22 and passes through filter 24. The voltage Vs after the filter 24 is compared with a reference voltage Vr from a voltage source 26 in a comparator 28. If Vs is greater than Vr then a change in state occurs in a binary switching signal provided at output 30. If Vs is less than Vr then the digital output signal reverts to its previous state. Hence a simple vibration detector is provided which provides a signal indicative that vibrations are occurring above a predetermined threshold without the need to actually measure the value itself.

FIG. 3 shows a personal vibration monitor in a preferred form which includes a wireless receiver 30 to receive information concerning the plant 10 being utilised.

The apparatus or plant 10 has firmly fitted to it a low frequency transmitter 31 which transmits a coded burst of data periodically to the monitor so that it can determine the type of apparatus being utilised and hence the levels of vibrations which will be experienced. Information on the types of equipments and the usage is stored in logger 32. Different types of equipment may be used by an operative in any one day and the cumulative levels can be stored.

FIG. 4 shows one form of automatic plant (or apparatus) recognition (APR) transmitter system 31 powered by a kinetic electrical generator.

The transmitter power source, typically piezo electric generator 40 utilises the kinetic energy of the plant when in use, to provide electrical power by converting the mechanical energy to electrical energy. The output is rectified, filtered and regulated by circuit 41 to provide a suitable electrical output, capable of operating the transmitter and associated control electronics. Such a permanent power source eliminates the need to replace batteries, etc. for maintenance of the transmitter.

A vibration detector 42 similar to that of the monitor is employed to detect when the plant is actually being operated. This signal is received by controller 43 so as to only send signals to the monitor when the apparatus is in use via the data encoder 44 and transmitter 45. The power is sufficiently low so that the signal is only received by the operator actually using the plant transmitting the code identifying the plant.

In an alternative form, the APR system may be powered by a battery supply or a solar cell/rechargeable battery combination.

This data transmitted provides information about the plant. Each transmitter may be programmed with a code, which uniquely identifies the plant type to which it is fitted. This allows many types of plant to be used with the vibration monitor.

The transmitter only sends its coded data, when the plant is in use, otherwise it is quiescent.

The logger 32 within the monitor of FIG. 3, which converts the received data burst from receiver 14, back to plant identity information. The data transmitted from the plant includes error checking, which provides a measure of security against incorrect plant information being logged. In use, it is conceivable that there may be several users, who are equipped with vibration monitors therefore the logger will only record plant information, when it experiences valid vibration trigger events. This together with the use of the low power (therefore short range) transmitter, largely precludes other users from acquiring plant information when not appropriate. This approach allows the receiver within the logger to be deactivated during periods when there are no valid vibration trigger events. This allows a power saving, and thus an increase in service life between battery changes in the logger.

Figure 5:
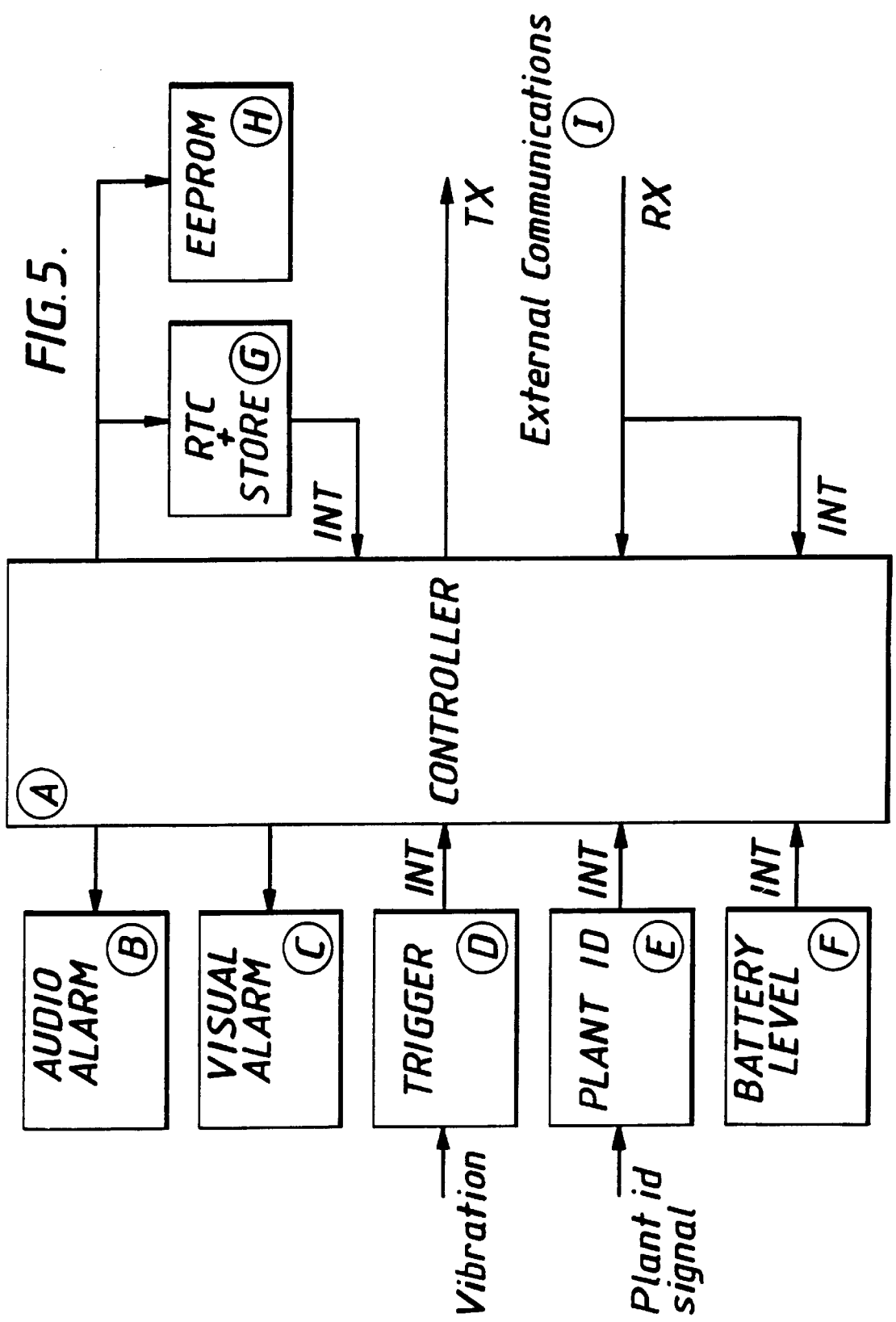
FIG. 5 is a block diagram showing the main elements of a logger used with the vibration monitor.

In order to collect the information necessary, to allow an individuals' vibration exposure to be calculated, a recording system, employing an electronically re-writable memory was designed for the logger and is shown in FIG. 5. The approach chosen allows several tasks to be carried out by the same electronic system. The logger must carry out the following operations:

(1) Record the type of apparatus responsible for the vibration, provided that such apparatus are catered for;
(2) Be able to time and date 'tag' valid records;
(3) Record the duration of any valid vibration event;
(4) Determine the validity of a vibration event for an exposure calculation; and
(5) Be able to communicate the stored information to a system which can, by using this information together with information relating to the vibrating apparatus, allow an individuals' vibration exposure to be calculated.

The vibration monitor described so far is intended to be of approximately the same size and shape as a wrist watch. In considering the above requirements, it is clear that any power source to be integrated within the above package and run the electronics must be small and therefore will have limited capacity. To this end low power, low voltage electronic devices are used in FIG. 5.

The main controller (A) logging operations is an 8 bit low voltage/power microcontroller, e.g. Phillips chip type P85CL00HFZ.

An audible warning device (B) is connected to the controller as is a visual warning device (C).

The accelerometer and signal processing electronics (D) has already been described above in FIG. 2.

The apparatus or plant recognition circuit (E) is shown which receives plant ID information for the controller.

A battery condition monitor (F) measured battery condition and can effect shutdown.

A real time clock and logger configuration data store (G) provides timing and operation data.

An 8 kilobyte logged data store, e.g. EEPROM provides information storage.

A serial (RS423) 3 wire communications link (I) provides the path for incoming and outgoing data (typically using an external host computer).

Figure 6:
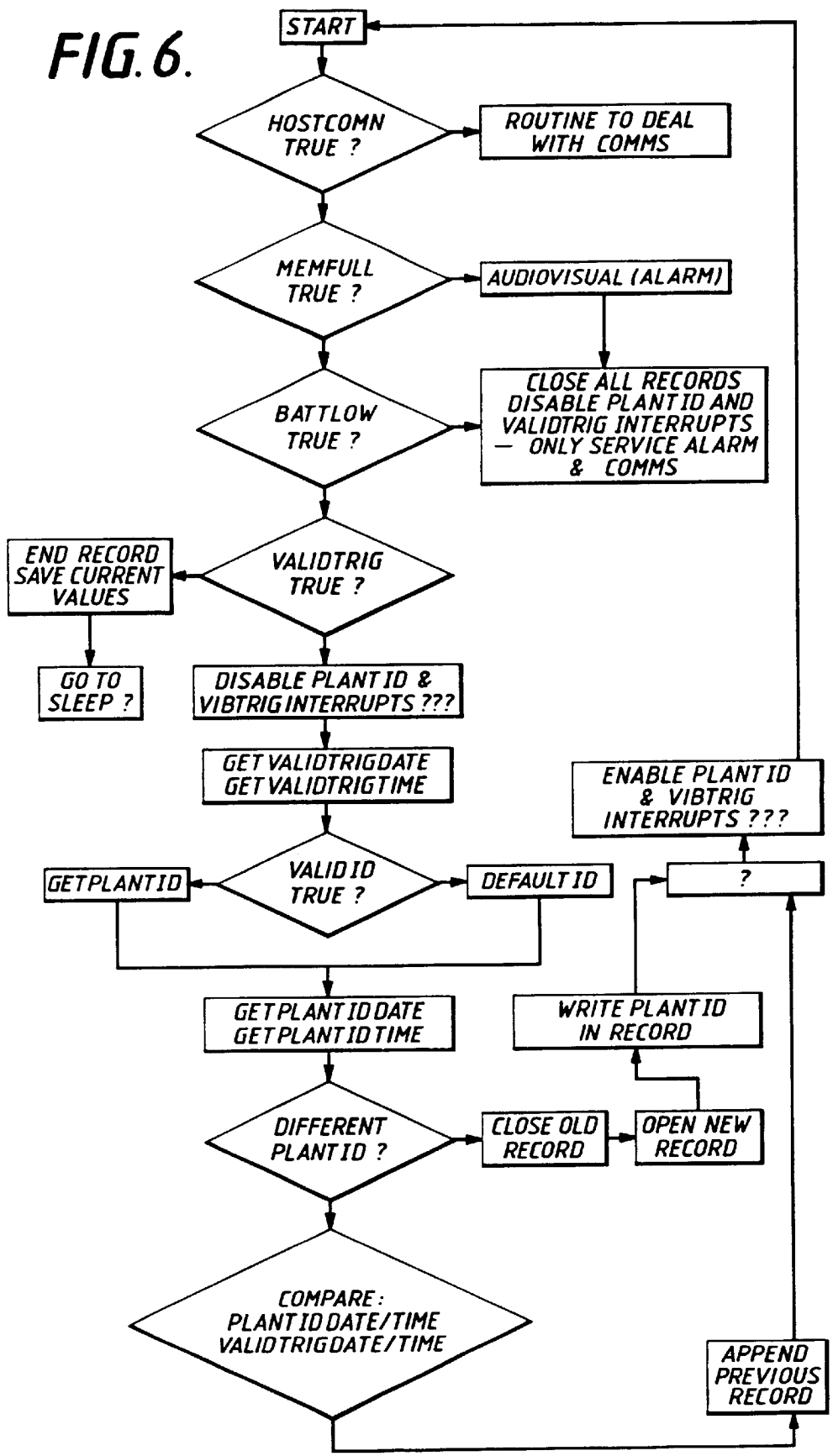
FIG. 6 shows a flow chart associated with the FIG. 5 operation.

A flow chart suitable for monitor system operation is shown in FIG. 6.

The monitor arrangement linked to a host computer is shown in FIG. 7. The block I of FIG. 5 is linked to the communications interface 50 to the host computer 51. Information to be printed out is available via printer 52.

Functional Description of Logger

Quiescent Mode

While not logging a valid vibration event, the logger will attempt to conserve power. In practice, this will mean that the device electronics will power down, with only the battery monitor, plant recognition and accelerometer circuits being active. These are necessary features, which permit the user to be notified of a low battery condition, as well as providing the means whereby vibration can be monitored continuously, forcing data to be logged only under valid conditions.

Alarm Mode

Valid alarm conditions are:

Logged data exceeds 95% of the memory capacity (inactive when in standby mode)

Low battery warning

Invalid plant identity received (inactive when in standby mode)

Communications error

Internal fault detected

When an alarm condition is detected the logger will sound and indicate an alarm. Such indications may be periodic. During the intervening time the logger will enter the quiescent mode described above. The only method of cancelling alarms will be via the host computer system, which will record the type, time and date of the latest alarm.

Standby Mode

The logging of data is disabled, and the logger is in the quiescent mode. The host computer sets standby mode.

Clear Mode

This is a transient condition, set by the host computer, always terminating in the standby mode. The following operations are carried out:

Logged records counters are reset to 0

Alarms and related logger data are cleared

The current plant identity is reset to the default value

If modem based communications are implemented, the blacklisting count is reset to 0 (only allowed in the local communications mode).

Although it is preferred that the identification of apparatus be done automatically, it is possible in an alternative to manually enter the identification code. A set of keys, which may be colour coded, are used to enter a code which uniquely identifies a plant type. The use of the keys will signal a wake-up condition to the logger microcontroller. The logger will leave the quiescent mode.

This method of entering plant information could lead to errors if the operator unwittingly enters inappropriate information relating to the wrong type of equipment.

The vibration monitor shown in FIG. 3 could be used as a monitor, rather like a radiation badge, the user's exposure being constantly monitored. If the total cumulative exposure exceeds a present value the user is signalled via an audio and/or visual indicator, e.g. flashing light or beeps. The exposure level at which this signal occurs would be either programmed via a communications link with the host computer or may be preset at manufacture.

The dosemeter as shown above, would have plant data stored internally in the form of a look-up table. Associating the plant data, together with the exposure duration, allows the daily exposure level to be continuously monitored. The monitor could also calculate the cumulative dose over a period of time set alarm thresholds programmed for various cumulative exposure levels.

The monitor may also include a digital display which would show the daily exposure and the cumulative dose over several days.

Logging Mode

The logging mode is normally entered subsequent to the quiescent mode. Logging of an elapsed time record begins upon receipt of a valid trigger condition.

Trigger information is provided by a digital pulse applied to one of the microcontroller input pins. This signal occurs whenever the input transducer experiences an acceleration typically more than $3ms^{-2}$. While a valid trigger exists an internal counter measures elapsed time. When the valid trigger conditions are no longer true the record start time, date, source and elapsed time are written to the logger's non-volatile memory. The logger then re-enters the quiescent mode.

NOTE: Following the first occurrence of a valid trigger the current date and time is written to the logger's working memory.

External Communications (with host computer—see FIG. 7)

The communication link with the host PC allows the logger to be configured as well as enabling data held in memory to be down-loaded to the host for post processing. Logging may continue during a dialogue, however, there are some restrictions to this (see below). This feature provides the following advantages:

1. The logger data can be monitored in real time.
2. The logger may be used as a remote instrument.
3. The calibration accuracy of the logger can be checked.
4. Provides a powerful debugging tool during instrument development.
5. The external communications facility may include support for modem-based remote communication. This is an optional facility.

The vibration monitor shown in FIG. 3 contains a semiconductor memory where the exposure duration, together with the type of plant responsible, is stored. Plant or apparatus details may be stored internally in the meter in the form of a look-up table or may be held in a host computer memory.

The logger will include facilities to communicate with a computer which will allow:

1. The download of logged data.
2. Setting of exposure level thresholds (if applicable).
3. Updating plant related details (when stored internally).
4. Other operations associated with the logging of vibration exposures.

The instrument may also incorporate any or all of the features previously described.

This configuration allows a workforce equipped with vibration loggers to be managed in respect of their plant usage and overall exposure to vibration. Analysis of each users exposure record being carried out by a host computer system.

The vibration monitor 14 shown in FIG. 3 may include a digital display showing vibration exposure level.

To re-cap, the vibration monitor may be implemented in several different ways:

1. PERSONAL MONITOR

A monitor, containing a look-up table of plant or apparatus type, cross referenced with weighted acceleration factor for each type of plant catered for. This will allow the current vibration exposure level to be calculated by the dosemeter itself.

2. VIBRATION LOGGER

A monitor which logs vibration exposure time, together with type of plant or apparatus responsible for each exposure record. The actual exposure level being calculated following the transfer of logged data to a host or base station computer.

3. PERSONNEL MONITOR AND LOGGER

A monitor which incorporates all the above features.

A system in which monitor data can be transferred to a host or base station computer will allow both analysis and management of a user's vibration exposure. Potentially, the host or base station computer system could be used to analyse data for many monitor users.

What is claimed is:

1. A vibration monitor to be worn by an operative comprising:

means for identifying plant or equipment in use by the operative to allow a predetermined vibration level associated with that plant or equipment to be available to the monitor, said identifying means receiving an identifying code identifying the plant or equipment in use from a transmitter, including a kinetic power source, associated with the plant or equipment in use; a piezoelectric sensor for detecting that vibration is occurring, and means for determining the elapsed time during which vibration is detected.

2. A monitor as claimed in claim 1 wherein the means for identifying equipment includes means for receiving a code indicative of the equipment to be utilized or the level of vibration to be expected.

3. A monitor according to claim 1 in which a code identifying the apparatus responsible for imposing the vibrations can be manually entered into the vibration monitor.

4. A monitor according to claim 1 in which a code identifying the apparatus responsible for imposing the vibrations is transmitted by a transmitter attached to the vibrating equipment for receipt by the vibration monitor.

5. A monitor according to claim 4 wherein the transmitter includes a kinetic power source.

6. A monitor according to claim 1 wherein storage means are provided for recording accumulated duration information and access means are provided to allow the accumulated duration information to be made available externally of the monitor.

7. A monitor as claimed in claim 6 wherein the information is made available by means of a computerized communications link.

8. A monitor according to claim 6 wherein the storage means includes means for identifying the date and time of day to accompany the accumulated duration information.

9. A monitor according to claim 1 wherein the vibration sensor is a binary device for producing a first signal when vibration is detected and a second signal when no vibration is detected.

10. A monitor as claimed in claim 1 wherein a calculator means is provided for producing an indication of total accumulated time and degree of vibration over a given period.

11. A monitor according to claim 1 wherein alarm means are provided to indicate when accumulated exposure reaches a predetermined level.

12. A method of monitoring vibration imposed by apparatus on an operative and comprising:

identifying plant or equipment in use by the operative to allow a predetermined vibration level associated with that plant or equipment to be available to a monitor by receiving an identifying code identifying the plant or equipment in use from a transmitter, including a kinetic power source, associated with the plant or equipment in use; and sensing, using a piezoelectric sensor, whenever vibrations are occurring and determining the elapsed time during which vibrations are detected.

13. A method as claimed in claim 12 including the step of storing vibration information concerning equipment to be utilized so as to determine accumulated vibration exposure for a given time.

14. A method as claimed in claim 12 including transmitting coded information from the utilised equipment by wireless means to identify the equipment being operated.

15. A method as claimed in claim 13 wherein information from the utilized equipment is communicated to a remote computer via a communications link.

16. A plant vibration monitoring system comprising a plant identity mechanism including means, carried by a plant or equipment being used, for producing an output indicative of the plant or equipment being used and a vibration monitor adapted to worn by an operative and including identifying means for sensing said output so as to identify the corresponding plant or equipment being used so as to allow a predetermined vibration level value associated with the corresponding plant or equipment to available to the monitor; detecting means, including a piezoelectric sensor, for detecting that vibration is occurring and for determining the elapsed time during which vibration is detected, said plant identity mechanism comprising a transmitter, including a kinetic power source, associated with the plant or equipment in use, for transmitting an identifying code identifying the plant or equipment in use.

17. A mechanism as claimed in claim 16 wherein the means includes a transmitter attached to the plant for transmitting a code indicative of the type of equipment being utilized.

18. A mechanism as claimed in claim 17 wherein the means includes a transmitter attached to the plant for transmitting information indicative of the level of vibration expected for that equipment.

* * * * *